United States Patent [19]

Robert

[11] 4,106,647
[45] Aug. 15, 1978

[54] METHOD OF HANDLING BARS
[75] Inventor: Daniel Robert, Ully St. Georges, France
[73] Assignee: Societe de Constructions Mecaniques de Creil-COMEC, Creil, France
[21] Appl. No.: 768,747
[22] Filed: Feb. 15, 1977
[30] Foreign Application Priority Data
  Apr. 2, 1976 [FR] France .................. 76 09628
[51] Int. Cl.² ............................................ B65G 7/00
[52] U.S. Cl. .................................. 214/152; 198/413; 214/1 QG
[58] Field of Search ............ 214/1 QG, 91 R, 130 R, 214/152, 1 Q; 198/403, 413

[56] References Cited
U.S. PATENT DOCUMENTS

| 1,295,195 | 2/1919 | Parker | 214/91 R |
| 2,909,876 | 10/1959 | McGihon | 198/403 X |

*Primary Examiner*—Drayton E. Hoffman
*Assistant Examiner*—George F. Abraham
*Attorney, Agent, or Firm*—Browdy & Neimark

[57] ABSTRACT

A method of disposing a bar of rectangular cross-section includes firstly placing the bar on a first substantially cylindrical surface which is connected to a second cylindrical surface along a common generatrix. Two tangential planes along the generatrix form a dihedral angle, preferably 145°. The first surface is then tilted to cause the bar to slide toward the common generatrix until it abuts against the apex of the dihedral angle. The tilt is increased until the bar either slides or tips onto the second surface. Thereafter, the bar, which rests on the second surface on one of its wider sides, is collected. An apparatus for carrying out the method includes at least two substantially cylindrical surfaces connected along a common generatrix. Two tangential planes along the generatrix form a dihedral angle, preferably 145°. The cylindrical surfaces are formed on the edges of at least two rotatable members of cruciform shape.

9 Claims, 7 Drawing Figures

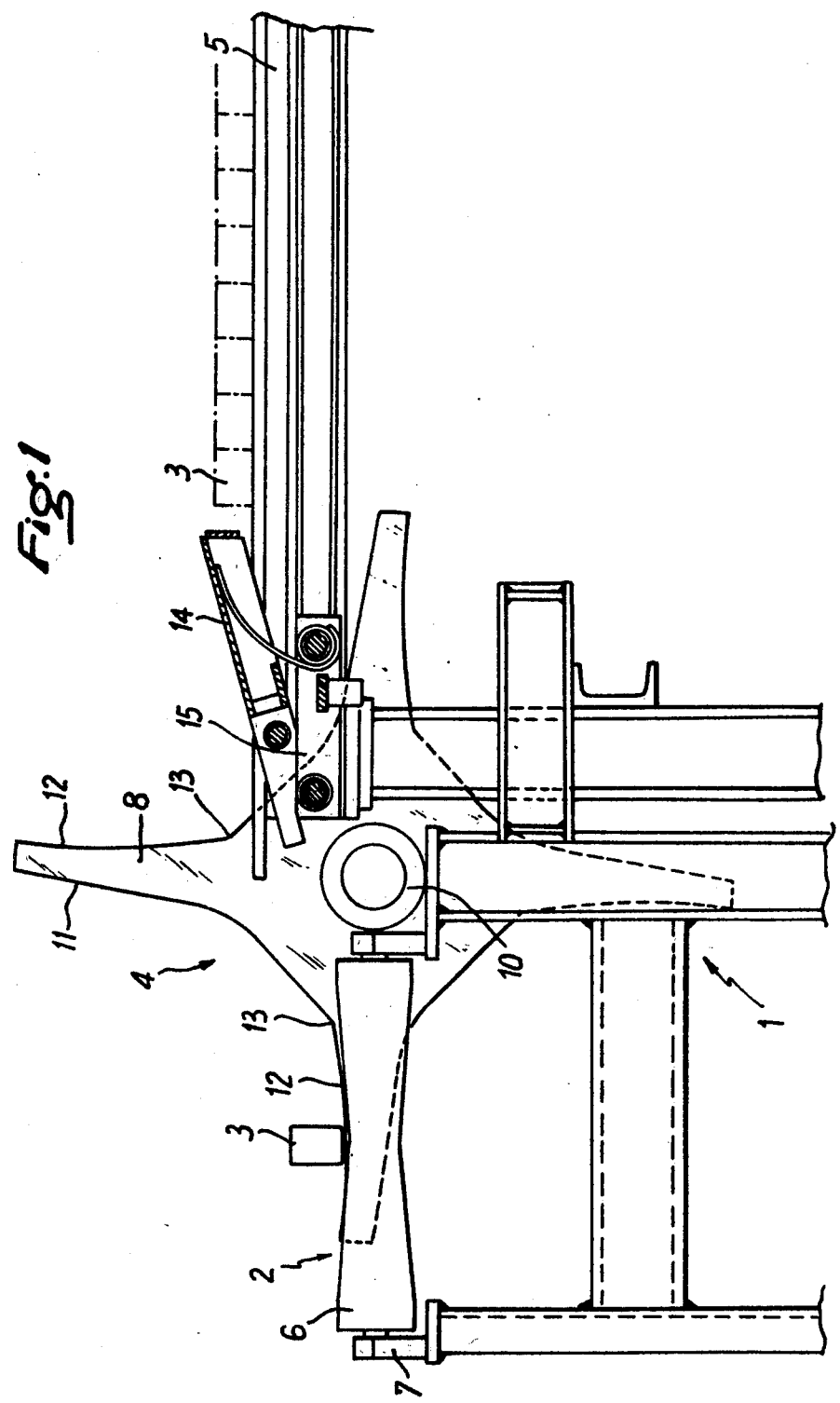

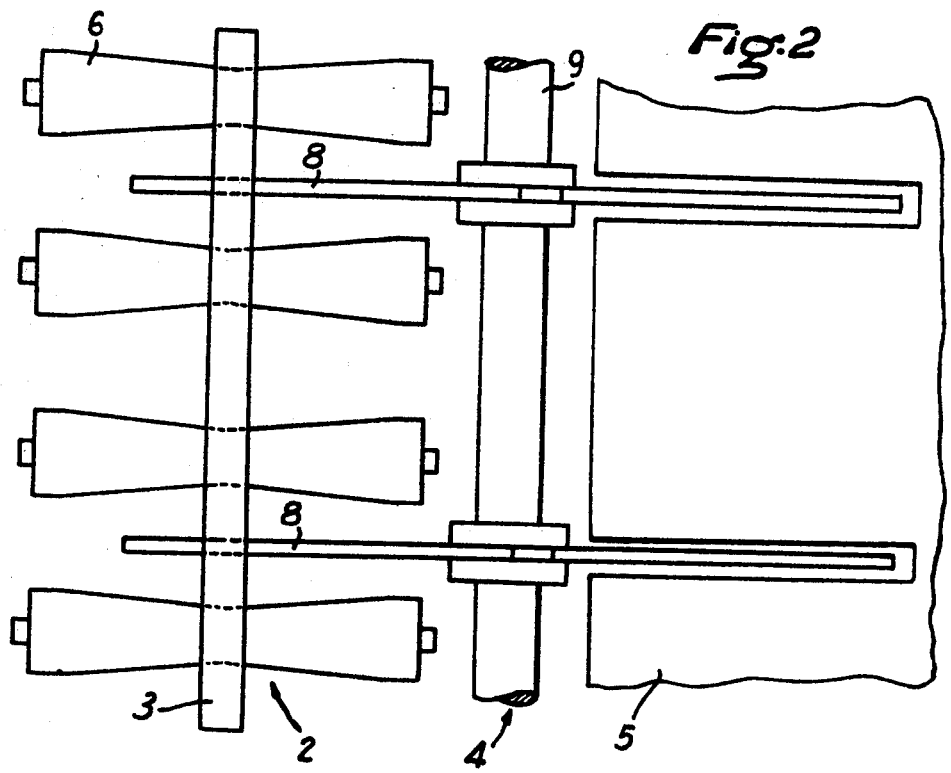
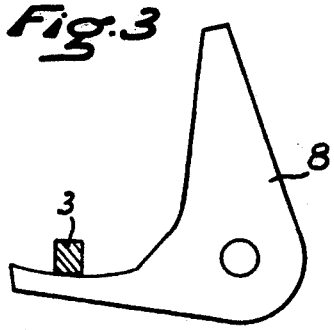
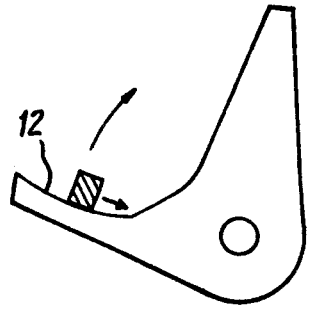
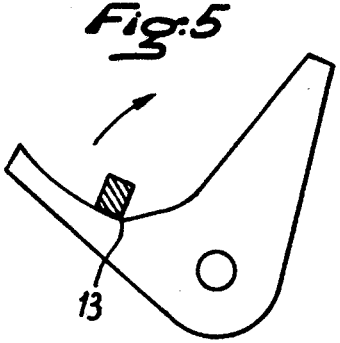
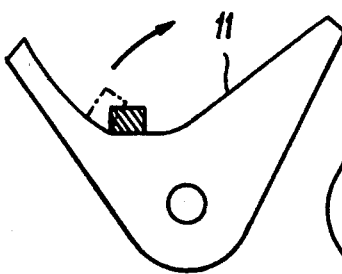
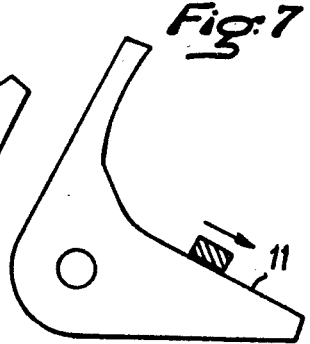

METHOD OF HANDLING BARS

BACKGROUND OF THE INVENTION

This invention relates to a method and apparatus for handling bars. The present invention relates, more particularly, to a method of and apparatus for disposing bars, whose outer envelope as defined by a cross-section is substantially rectangular in shape on one of the wider sides. These bars may be solid, may be tubes having rectangular cross-sections or may have other cross-sectional shapes, such as the shape of an unequal angle iron.

When the bars leave manufacturing or processing machinery such as shearing machines, for example, it is necessary to store the bars by placing them side by side and, therefore, stacking the rows of bars so formed. When these bars have a substantially rectangular cross-section, it is essential, for this purpose, for all the bars to be set down on the same side, whether it be one of the narrower sides or one of the wider sides.

SUMMARY OF THE INVENTION

It is an object of the present invention to provide a method of disposing a bar, having flat rectangular surfaces, which effects the placement of the bar on one of its wider sides.

It is another object of the present invention to provide an apparatus for disposing a bar, having flat rectangular surfaces, which in operation assures placement of the bar on one of its wider sides.

The present invention, in its method aspect, includes the steps of placing a bar on a first and substantially cylindrical surface joined to a second substantially cylindrical surface by a common generatrix such that the two tangential planes along this generatrix form a dihedral angle, tilting this first surface to cause the bar to slide in the direction of the common generatrix until it abuts against the dihedral angle, increasing the inclination so that the bar tips onto the second surface if it is placed on one of its narrower sides or passes to the second surface, sliding without tipping, if it is placed on one of its wider sides, tilting the second surface to cause said bar to slide such that it moves away from the common generatrix, and collecting the bar on the side on which it is resting.

The term "cylindrical surface" is to be understood in the general sense of a surface generated by movement of a line parallel to itself. The common generatrix is the intersection of two cylindrical surfaces.

It has been found that if the value of the dihedral angle is properly chosen, the method gives excellent results, even if the bars are nearly square in cross-section.

The present invention, in its apparatus aspect, includes cylindrical surfaces, connected along a common generatrix such that the two tangential planes along this generatrix form a dihedral angle, and means for causing these surfaces to pivot about an axis essentially parallel to their generatrices.

Gradual tilting of the surfaces is ensured by rotation about an axis.

Preferably, each of said substantially cylindrical surfaces is in the form of at least two edges formed by rotating elements, each edge constituting the intersection of this surface with a plane perpendicular to its generatices.

In fact, it is unnecessary to cause the bars to slide on the surfaces themselves. They need only be held at two points and made to slide on these edges.

In a preferred embodiment of the present invention a plurality of at least two rotating members are provided, each rotating member having a generally cruciform shape, in side view, forming four pairs of edges which are coupled pairwise, forming a sharp angle and creating four pairs of substantially cylindrical surfaces.

In this case, the means for causing the substantially cylindrical surfaces to pivot, preferably comprise a shaft on which are mounted, rotationally integral with this shaft, the cruciform elements, and means for causing the shaft to rotate in quarter-turn steps.

One can thus, rest a bar on two corresponding arms, each belonging to one of two cruciform members, and disposed substantially horizontally, while the cruciform elements are stationary, then drive the elements through a quarter of a turn, then collect the bar placed on its desired side. Since the cruciform members have stopped once again, another bar is set in place on the next pair of arms and the operation resumes. Thus, four bars can be handled each time the elements make a rotation.

In order to assure that the present invention achieves the objects of the present invention as it should, namely for only the desired bars to tilt in any given case, the dihedral should be carefully chosen. It goes without saying that if this angle is too large all the bars will tilt, while if the angle is too small no bars will tilt. It has been found that if the dihedral angle is substantially 145° even rectangular bars having nearly square cross-sections will be placed on their desired wider surface.

BRIEF DESCRIPTION OF THE DRAWINGS

FIG. 1 is a side view of an apparatus for disposing a bar on one of its wider sides according to an exemplary embodiment of the present invention.

FIG. 2 is a simplified, diagrammatic top view of the apparatus of FIG. 1.

FIGS. 3 to 7 are diagrams illustrating the operation of the apparatus shown in FIGS. 1 and 2.

DETAILED DESCRIPTION OF THE PREFERRED EMBODIMENT

The preferred embodiment of an apparatus for disposing bars as illustrated in FIGS. 1 and 2 is mounted on a frame 1. The frame 1 has conveying means 2 for conveying bars 3 individually into a position over transfer means 4 which, in operation, effect the tilting of the bars 3 onto one or the other of their wider sides. A table 5 is arranged to receive the bars 3 from the transfer means 4 and store them.

The conveying means 2 includes a series of tapered rollers 6 mounted on bearings 7 in the frame 1.

The transfer means 4, as illustrated, includes two cruciform members 8 mounted integrally to a shaft 9, the shaft 9 being carried rotationally in bearings positioned in the frame 1. The shaft 9 is driven by a motor 10 also mounted on the frame 1.

Each arm of each cruciform member 8 has two edges 11 and 12. In the illustrated embodiment, the edge 12 is substantially an arc of a circle of very large radius, while the edge 11 has two rectilinear portions connected by an arcuate portion. The two edges 11 and 12 of two adjacent arms of each cruciform member 8 meet at an apex 13 to form a sharp angle of substantially 145°. Thus, the corresponding edges 11 and 12 of the two cruciform members 8 define two cylindrical surfaces which meet along their common generatrix passing through the two corresponding apexes 13. The surfaces formed by the edges 11 include two portions of planes connected by one portion of a cylinder with a circular base, while the edges 12 form two portions of a cylinder with a circular base. The apparatus also includes a finger 14 mounted in conventional fashion on a movable carriage 15 which can shift along the table 5. The table 5 also is provided with two slots (FIG. 2) enabling the cruciform members 8 to pass through.

The operation of the apparatus is illustrated diagramatically in FIGS. 3 to 7 wherein a single face of one of the cruciform members 8 is illustrated in association with a single bar 3.

With the apparatus stopped, a single bar 3 is brought, with the aid of the rollers 6, to the position shown in FIGS. 1 and 2. In this position, the bar 3 is slightly above one of the pairs of the edges 12 of the cruciform members 8. The cruciform members 8 are then caused to move clockwise, as shown in FIGS. 3 to 7. The bar 3 then comes to rest on the two edges 12 as shown in FIG. 3; then, while the rotational movement continues, the bar 3 begins to slide in the direction of the sharp angles determined by the apexes 13, as shown in FIG. 4. The bar 3 thus, comes to abut these apexes 13 (FIG. 5). If the angle defined by the apexes 13 has a suitably chosen value, for example 145°, the bar 3 tilts onto the edges 11 as shown in FIG. 6 if it had previously been placed on one of its narrower sides, even when the bar 3 is nearly square in cross-section, but it slides past the apexes 13 if it had been placed on one of its wider sides. Since the rotational movement continues, the bar 3 then slides along the edges 11 as shown in FIG. 7, and finally comes to rest on the table 5, while the apparatus is stationary. Another bar is then brought on the arms of the cruciform members 8 while the finger 14 driven by the carriage 15 pushes the bar 3, which has just been placed on the table 5, until it contacts the preceding bar to form a row of bars which are all disposed on one of their wider sides.

The apparatus thus, has the advantage of being relatively simple.

It goes without saying that the present invention is not limited to the illustrated embodiment described hereinabove and shown in the accompany figures of drawing. It is to be appreciated that other embodiments and variants are possible without departing from the spirit and scope of the invention, its scope being defined in the appended claims.

What is claimed is:

1. A method of disposing a bar having an outer envelope, as seen in cross-section, substantially rectangular shape, on one of its wider sides, the method comprising:
    placing said bar on a first substantially cylindrical surface connected to a second substantially cylindrical surface along a common generatrix such that the two tangential planes along this generatrix form a dihedral angle;
    tilting said first surface to cause said bar to slide in the direction of said common generatrix until it abuts against the apex of said dihedral angle;
    increasing the tilt so that said bar tips onto said second surface if it is positioned on one of its narrower sides, or slides onto said second surface without tilting if it is positioned on one of its wider sides;
    tilting said second surface to cause said bar to slide away from said common generatrix; and
    collecting said bar with that one of its sides on which it has come to be positioned in a given orientation.

2. A method of disposing bars according to claim 1, wherein said tilting and increasing steps comprise pivoting these surfaces about an axis essentially parallel to their generatrices.

3. A method according to claim 2, wherein the steps of providing said first and second surfaces are applied to at least two edges of several rotatable members, each said edges having an intersection of said surfaces located in a plane perpendicular to their generatrices.

4. A method according to claim 3, including forming each rotatable member in a generally cruciform shape, each member having four pairs of connected edges with each edge defining two substantially cylindrical surfaces.

5. A method according to claim 4, wherein the step of pivoting said substantially cylindrical surfaces, includes mounting said members of cruciform shape on a shaft, and rotating said members with said shaft in quarter-turn steps.

6. A method according to claim 5, including bringing the bar to one of the substantially cylindrical surfaces with its longitudinal axis substantially parallel to said common generatrix.

7. A method according to claim 6, including providing said dihedral angle with a value of about 145°.

8. A method according to claim 2, including bringing the bar to one of the substantially cylindrical surfaces with its longitudinal axis substantially parallel to said common generatrix.

9. A method according to claim 2, including providing said dihedral angle with a value of about 145°.

* * * * *